United States Patent
Simoni

(10) Patent No.: US 7,322,178 B2
(45) Date of Patent: Jan. 29, 2008

(54) DEVICE FOR INDICATING A RESIDUAL POWER MARGIN OF AIRCRAFT TURBINE ENGINES

(75) Inventor: Maurizio Simoni, Samarate (IT)

(73) Assignee: Agusta S.p.A., Samarate (IT)

( * ) Notice: Subject to any disclaimer, the term of this patent is extended or adjusted under 35 U.S.C. 154(b) by 439 days.

(21) Appl. No.: 11/046,900

(22) Filed: Feb. 1, 2005

(65) Prior Publication Data

US 2006/0064959 A1    Mar. 30, 2006

(30) Foreign Application Priority Data

Feb. 3, 2004    (IT)    ............................ TO2004A0050

(51) Int. Cl.
*F02C 9/00*    (2006.01)
(52) U.S. Cl. ...................... 60/39.281; 60/803
(58) Field of Classification Search .............. 60/39.24, 60/39.27, 39.281, 803
See application file for complete search history.

(56) References Cited

U.S. PATENT DOCUMENTS

| | | | |
|---|---|---|---|
| 3,181,353 A | 5/1965 | Brahm et al. | |
| 3,272,004 A * | 9/1966 | Haverl | ...................... 73/117.3 |
| 4,736,331 A * | 4/1988 | Lappos et al. | ................. 701/14 |
| 5,986,580 A | 11/1999 | Permanne | |
| 6,195,598 B1 * | 2/2001 | Bosqui et al. | .................. 701/3 |
| 6,411,869 B2 * | 6/2002 | Permanne | ...................... 701/3 |

FOREIGN PATENT DOCUMENTS

| | | |
|---|---|---|
| FR | 2 756 256 | 5/1998 |
| FR | 2 809 082 | 11/2001 |

\* cited by examiner

*Primary Examiner*—L. J. Casaregola
(74) *Attorney, Agent, or Firm*—Berenato, White & Stavish

(57) ABSTRACT

A device for indicating a residual power margin of aircraft turbine engines includes a measuring stage associated with at least one turbine engine of an aircraft to measure a number of first parameters related to a power output of the engine; a calculating unit associated with the measuring unit to calculate at least one second parameter indicating the power output of the engine on the basis of the first parameters; and a display. The display includes a power scale having at least one reference indicator indicating an operating limit of the engine; and at least one cursor cooperating with the power scale and the reference indicator to simultaneously display a current value of the second parameter and an available power margin of the engine.

8 Claims, 4 Drawing Sheets

| Hp | ΔTQ | ΔNG | ΔITT |
|-----|-----|-----|------|
| Hp0 | 10 | 2 | 1 |
| Hp1 | 10 | 3.2 | 1.8 |
| Hp2 | 10 | 6 | 3 |
| Hp3 | 10 | 8 | 3.9 |

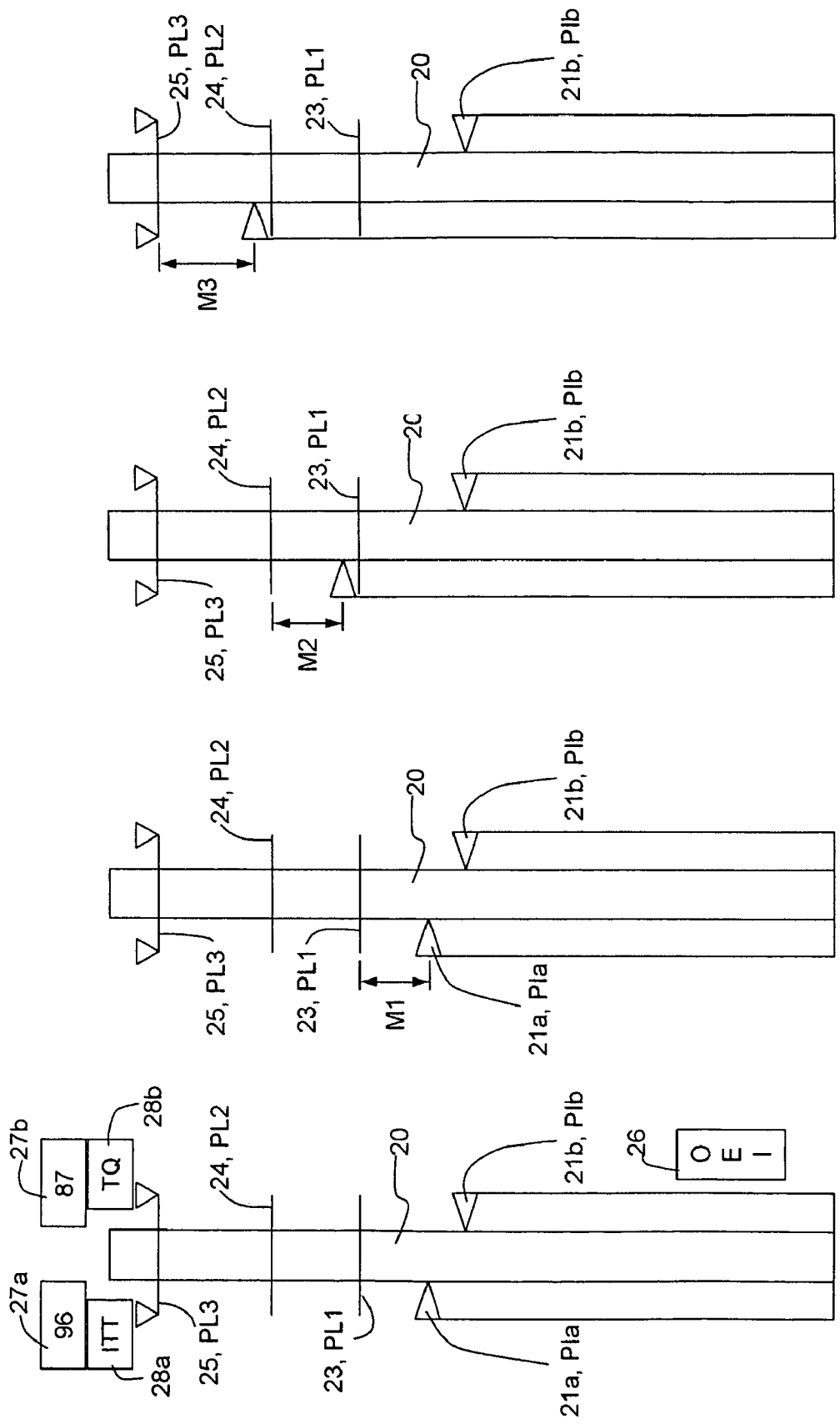

DEVICE FOR INDICATING A RESIDUAL POWER MARGIN OF AIRCRAFT TURBINE ENGINES

The present invention relates to a device for indicating the residual power margin of an aircraft equipped with at least one turbine engine.

BACKGROUND OF THE INVENTION

As is known, flight control of a modern turbine engine aircraft calls for constant monitoring of a number of parameters indicating both the attitude and operating conditions of the aircraft. For this purpose, various measuring instruments and relative indicators are normally provided to supply the pilot with all the necessary flight control information. The indicators must obviously be installed on the aircraft instrument panel to give the pilot a clear view of the most important parameter values in terms of flight safety, while secondary indicators may be installed in peripheral areas.

In particular, it is essential that the pilot be provided with sufficient information to assess residual engine power and so safely determine whether or not flight conditions are compatible with engine efficiency, and which manoeuvres can or cannot be performed. In turbine engine aircraft, the operating conditions of each engine are basically defined by three engine parameters: output torque, turbine rotation speed, and turbine input (or reference) temperature. These parameters are related to power output, and have different operating limits depending on engine speed and ambient conditions (e.g. pressure and temperature, which vary considerably with altitude). In other words, varying power demand of the engine produces variations in all three engine parameters, but by amounts depending on engine speed and ambient conditions. As a result, the first parameter to exceed a respective operating limit need not necessarily always be the same, depending on flight conditions, and the relationship between the variations of two parameters is also affected by operating conditions.

Conventional instruments, however, indicate the power output of each engine basically in the form of a torque reading, which the pilot interprets more or less intuitively. Torque, however, does not give an absolute indication of the residual power margin available. In fact, depending on operating conditions, one of the other two engine parameters may exceed a respective operative limit though the instruments still indicate a residual torque margin. In other words, power margin and engine operating condition assessment depends on the pilot's experience and on combined monitoring of various indicators. In critical flight conditions, however, assessment in this way may take too long, thus constituting a safety hazard, and may even be erroneous. Moreover, the large number of parameters to be monitored results in crowding of the instrument panel, especially in the case of dual controls, which means all the indicators must also be duplicated. As a result, instrument readings are made difficult and, more importantly, slower, on account of the pilot's difficulty in immediately focusing solely on the main instruments (in themselves numerous). In difficult or even emergency flight conditions, such a situation may prove extremely hazardous.

SUMMARY OF THE INVENTION

It is an object of the present invention to eliminate the aforementioned drawbacks.

According to the present invention, there is provided a device for indicating the residual power margin of aircraft turbine engines, comprising:
- detecting means associated with at least one turbine engine of an aircraft to detect a number of first parameters related to a power output of the engine;
- calculating means associated with the detecting means to calculate at least one second parameter indicating the power output of the engine on the basis of said first parameters; and
- display means;
characterized in that said display means comprise a power scale having at least one reference indicator indicating an operating limit of the engine; and at least one cursor cooperating with said power scale and with said reference indicator to simultaneously display a current value of the second parameter and an available power margin of the engine.

BRIEF DESCRIPTION OF THE DRAWINGS

A number of non-limiting embodiments of the invention will be described by way of example with reference to the accompanying drawings, in which:

FIG. 7 shows a schematic front view of a component part of the FIG. 1 device;

FIGS. 8*a*-8*c* show the FIG. 7 component part in different operating conditions.

DETAILED DESCRIPTION OF THE INVENTION

Figure 1:
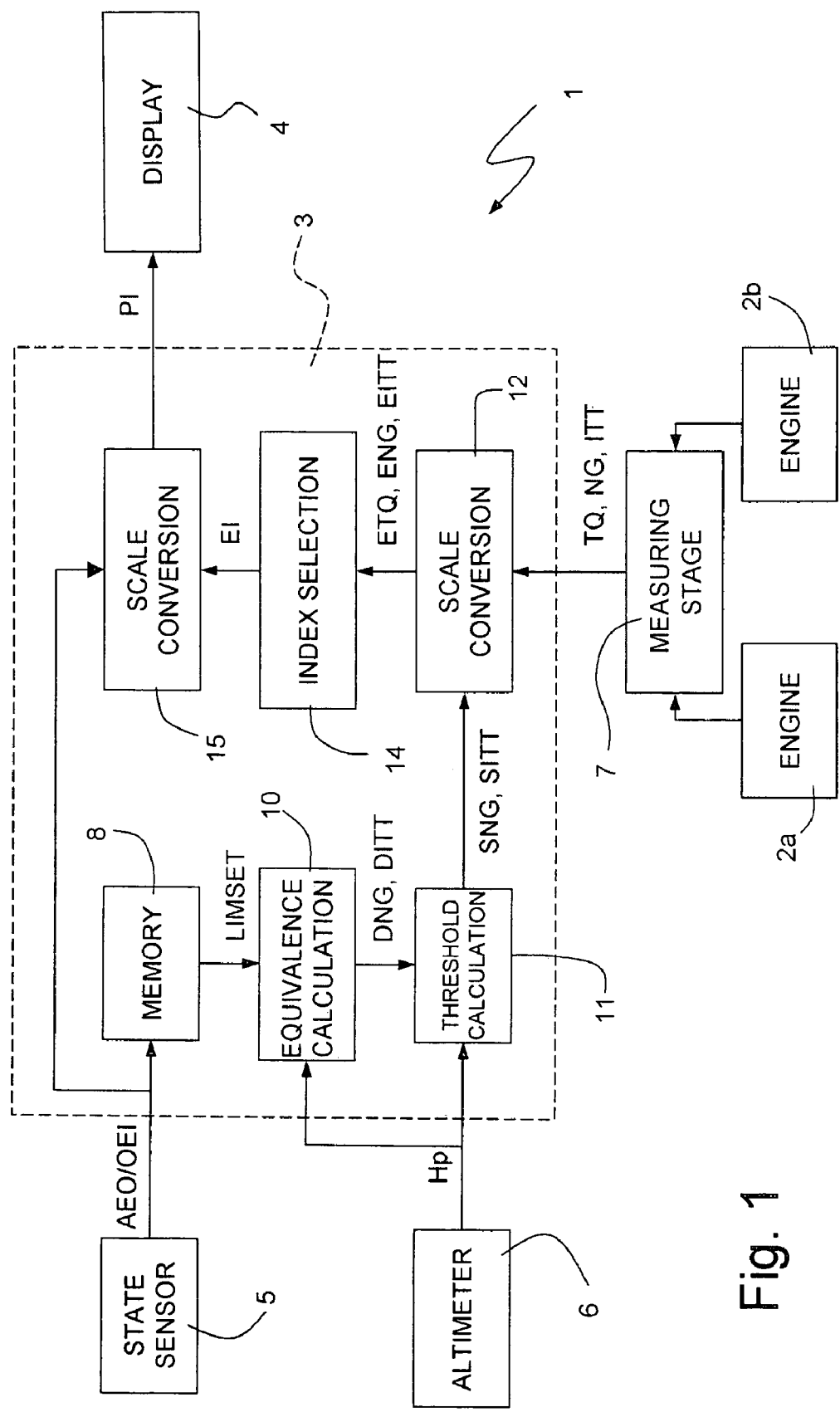
FIG. 1 shows a simplified block diagram of an indicator device in accordance with the present invention.

FIG. 1 shows a device 1 for indicating the residual power margin of an aircraft equipped with at least one turbine engine, in this case a helicopter (not shown) equipped with twin engines 2*a*, 2*b*, to which, since the invention may be applied advantageously to any type of aircraft equipped with at least one turbine engine, reference is made in the following description purely by way of a non-limiting example.

Device 1 comprises a control unit 3; a digital display 4 on the helicopter instrument panel (not shown); and a number of detectors connected to control unit 3 and including a state sensor 5, altimeter 6, and engine parameter measuring stage 7.

State sensor 5 supplies control unit 3 with a state signal AEO/OEI having a first logic value indicating a normal operating state (AEO, All Engines Operative), and a second logic value indicating a deficient operating state, i.e. breakdown of either of engines 2*a*, 2*b* (OEI, One Engine Inoperative).

Altimeter 6 supplies control unit 3 with an altitude signal Hp indicating the altitude of the helicopter.

For each engine 2*a*, 2*b* of the helicopter, measuring stage 7 acquires and supplies control unit 3 with a torque TQ, a turbine rotation speed NG, and a turbine input gas temperature ITT. As is known, the above engine parameters indicate the instantaneous power output of engines 2*a*, 2*b*, and are related to one another as explained below.

Control unit 3 comprises a memory 8 and a number of processing stages, namely: an equivalence calculation stage 10; a threshold calculation stage 11; a scale conversion stage 12; an index selection stage 14; and a scale conversion stage 15.

Memory 8 receives state signal AEO/OEI from state sensor 5, and supplies equivalence calculation stage 10 with a set of values LIMSET relative to a number of torque TQ, speed NG, and temperature ITT operating limits of engines 2a, 2b. More specifically, the operating limits comprise:

continuous power limits TQL1, NGL1, ITTL1, indicating the maximum power that can be supplied continuously with no time limit;

term power limits TQL2, NGL2, ITTL2, which are higher than respective continuous power limits TQL1, NGL1, ITTL1, and indicate the maximum power than can be supplied for at most a predetermined time interval (e.g. in AEO state, the maximum takeoff power or TOP);

transient power limits TQL3, NGL3, ITTL3, which are higher than respective term power limits TQL2, NGL2, ITTL2, and indicate the maximum power than can be supplied for emergency manoeuvres over a short transient period only and not exceeding a predetermined duration; and maximum limits TQL4, NGL4, ITTL4.

The value set LIMSET depends on the operating conditions of engines 2a, 2b, and can be selected as a function of the value of state signal AEO/OEI.

Hereinafter, for the sake of simplicity, reference will be made to a procedure for calculating and displaying a power index relative to one of engines 2a, 2b; it being understood, however, that the same procedure is performed in parallel for both engines 2a, 2b to obtain a respective power index for each.

Figures 2, 6:
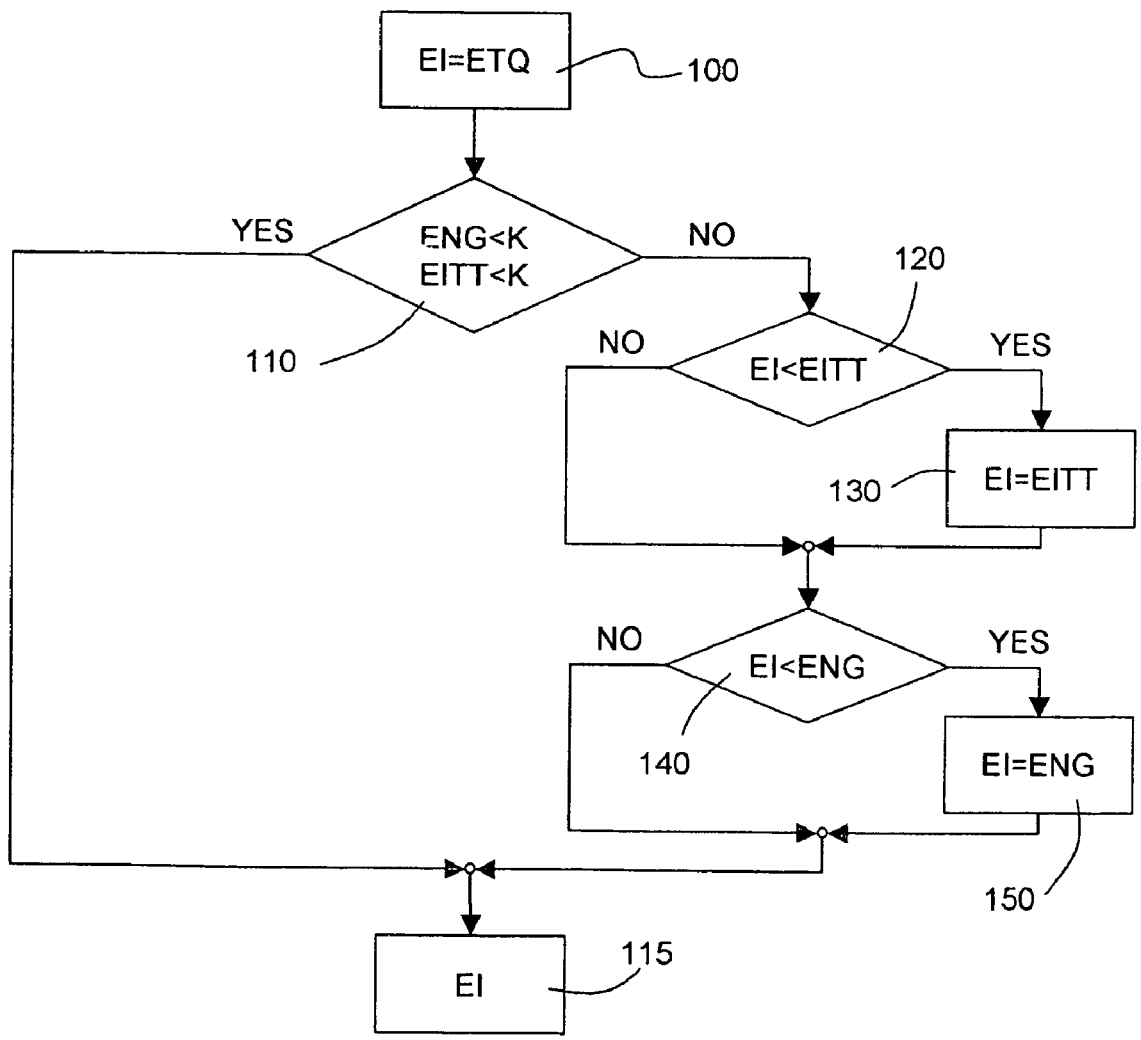
FIG. 2 shows a table memorized in the FIG. 1 device.
FIG. 6 shows a flow chart of a procedure implemented by the FIG. 1 device.

On the basis of the selected value set LIMSET and the value of altitude signal Hp from altimeter 6, equivalence calculation stage 10 calculates the relative variations in speed DNG and temperature DITT with respect to predetermined variations in torque TQ. As stated, engine parameters TQ, NG, ITT are interrelated and the relative variations are affected by operating conditions, in particular helicopter altitude. In other words, the same variations in torque TQ correspond to different variations in speed NG and temperature ITT, depending on altitude. To reconstruct the relationship between the variations in torque TQ, speed NG, and temperature ITT, a reference table, as shown in FIG. 2, is stored in equivalence calculation stage 10, and contains the relationships between the variations in engine parameters TQ, NG, ITT at predetermined altitudes and in operating conditions of engines 2a, 2b close to continuous power limits TQL1, NGL1, ITTL1. Equivalence calculation stage 10 calculates the relative variations in speed DNG and the relative variations in temperature DITT by interpolating the FIG. 2 table values on the basis of the value of altitude signal Hp.

Threshold calculation stage 11 receives the relative variations in speed DNG and the relative variations in temperature DITT, and uses them to determine respective relative thresholds SNG, SITT of speed NG and temperature ITT. More specifically, relative thresholds SNG, SITT are defined respectively as a function of the continuous power limit NGL1 of speed NG, and of the continuous power limit ITTL1 of temperature ITT, according to the equations:

$$SNG = NGL1(1-\alpha DNG) \quad (1)$$

$$SITT = ITTL1(1-\alpha DITT) \quad (2)$$

where $\alpha$ is a parameter expressing a percentage value (preferably 15%).

Figure 3:
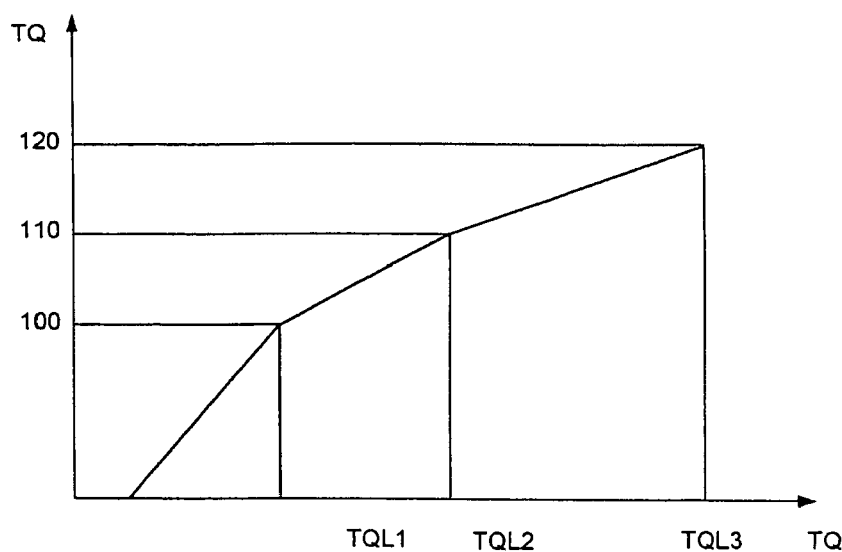
FIGS. 3-5 show graphs of quantities relative to the FIG. 1 device.
Figure 4:
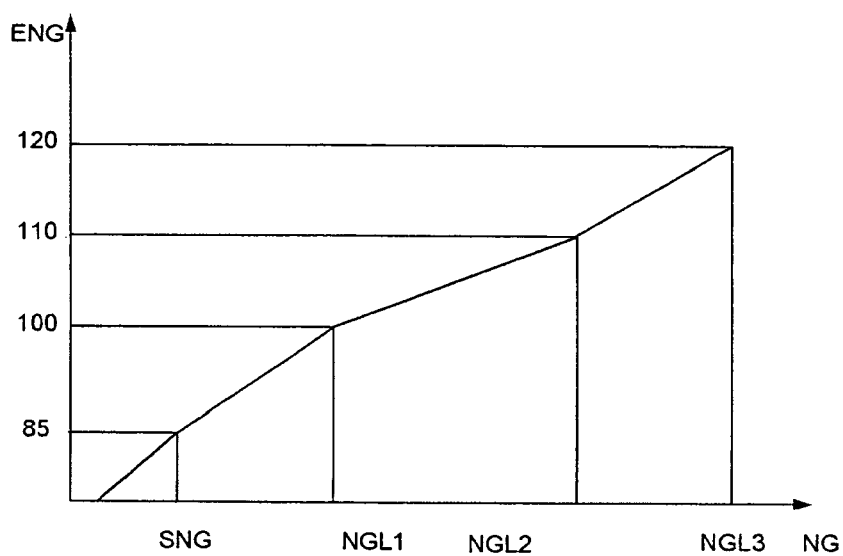
Figure 5:
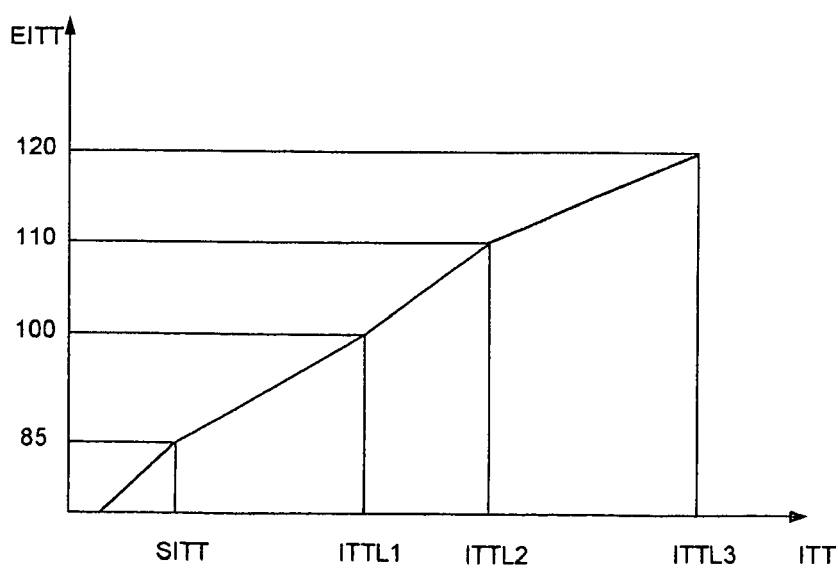

Scale conversion stage 12 receives torque TQ, speed NG, and temperature ITT from measuring stage 7, and relative thresholds SNG, SITT from threshold calculation stage 11, and, by means of interval-linear scale transformations, calculates an equivalent torque ETQ, an equivalent speed ENG, and an equivalent temperature EITT in a common uniform scale, in which the operating limits are used as references. More specifically (FIGS. 3-5), the scale transformations operate so that, for equivalent torque ETQ, for equivalent speed ENG, and for equivalent temperature EITT, the values of term power limits TQL2, NGL2, ITTL2 and of transient power limits TQL3, NGL3, ITTL3 equal 110% and 120% respectively of the values of respective continuous power limits TQL1, NGL1, ITTL1; and the values of relative thresholds SNG, SITT of speed NG and temperature ITT equal 85% of the values of continuous power limits NGL1, ITTL1 respectively. In other words, if a value of 100 is assigned in the uniform scales to the continuous power limit of each of engine parameters TQ, NG, ITT, the term and transient power limit values always equal 110 and 120 respectively. Equivalent torque ETQ, equivalent speed ENG, and equivalent temperature EITT are homogenous and therefore comparable with one another. In the uniform scale, the differences between the current equivalent torque ETQ, equivalent speed ENG, and equivalent temperature EITT values and the respective operating limits represent, in percentage terms, the residual power margins of each operating limit. In other words, the highest of equivalent torque ETQ, equivalent speed ENG, and equivalent temperature EITT corresponds to the lowest residual power margin, and indicates the next operating limit that will be exceeded in the event of increased power demand by the pilot.

Index selection stage 14 receives equivalent torque ETQ, equivalent speed ENG, and equivalent temperature EITT, and selects an equivalent index EI as explained below with reference to FIG. 6. To begin with, equivalent power index EI is made equal to equivalent torque ETQ (block 100). A test is then performed (block 110) to determine whether equivalent speed ENG and equivalent temperature EITT are below a predetermined value K (of 100 or less). If they are (YES output of block 110), the selected equivalent index EI remains unchanged and is supplied to scale conversion stage 15 (block 115; see also FIG. 1); conversely, (NO output of block 110), the equivalent index is compared with equivalent temperature EITT (block 120). If equivalent index EI is the lesser of the two (YES output of block 120), it is updated and made equal to the value of equivalent temperature EITT (block 130); conversely (NO output of block 120), equivalent index EI remains unchanged and is compared with equivalent speed ENG (block 140). Similarly, if equivalent index EI is the lesser of the two (YES output of block 140), it is made equal to equivalent speed ENG (block 150); conversely (NO output of block 140), it remains unchanged and is transmitted.

In other words, the equivalent index EI supplied to scale conversion stage 15 equals the highest of equivalent torque ETQ, equivalent speed ENG, and equivalent temperature EITT, unless equivalent speed ENG and equivalent temperature EITT are below value K; in which case, equivalent index EI is made equal to equivalent torque ETQ. Otherwise, i.e. during continuous operation of engines 2a, 2b, equivalent index EI equals equivalent torque ETQ, which is the most significant parameter and the one most readily interpreted by the pilot.

Scale conversion stage 15 receives equivalent index EI from index selection stage 14, and state signal AEO/OEI from state sensor 5, and supplies display 4 with a power index PI determined by means of interval-linear scale transformations correlated to the value of state signal AEO/OEI. More specifically, the scale of power index PI is expanded within a range of values comprising the operating limits, and is compressed outside the range so that, as explained below, the next graphic display of power index PI is easier for the pilot to interpret in the most critical situations (i.e. when one of the operating limits is exceeded). Scale expansion within said range of values is greater during normal operation of engines 2a, 2b, i.e. when state signal AEO/OEI assumes the first logic value.

As stated, device 1 employs the procedure described to calculate a first and a second power index PIa, PIb, each relative to a respective engine 2a, 2b, which are then supplied to display 4. With reference to FIG. 7, display 4 comprises a graduated column 20 defining a power scale, and having a first and a second cursor 21a, 21b movable along opposite sides of column 20, and the positions of which indicate the current values of first and second power index PIa, PIb respectively. Column 20 also has three reference indicators 23, 24, 25 indicating a continuous operating limit PL1, a term operating limit PL2, and a transient operating limit PL3 respectively of power indexes PIa, PIb. Display 4 preferably also comprises a state window 26, which reads "OEI" when state signal AEO/OEI assumes the second logic value; parameter windows 28a, 28b showing which engine parameters TQ, NG, ITT the current power indexes PIa, PIb refer to (in the example shown, ITT and TQ respectively); and value windows 27a, 27b showing the absolute values of the parameters shown in corresponding windows 28a, 28b.

Operating limits PL1, PL2, PL3 coincide at all times with the operating limits of the engine parameters (torque TQ, speed NG, temperature ITT) selected to determine the first and second power index PIa, PIb. For example, assuming index selection stage 14, at a given instant, selects equivalent speed ENG of engine 2a to determine first power index PIa. In this case, continuous operating limit PL1, term operating limit PL2, and transient operating limit PL3 correspond respectively to continuous power limit NGL1, term power limit NGL2, and transient power limit NGL3 relative to speed NG of engine 2a.

In other words, display 4 shows the residual power margins before power indexes PIa, PIb exceed the operating limits. Which margins are represented visually by the difference between the current positions of cursors 21a, 21b and reference indicators 23, 24, 25 relative to operating limits PL1, PL2, PL3 respectively. With reference to first power index PIa, depending on the speed of engine 2a, first cursor 21a indicates (FIGS. 8a-8c, in which parts of display 4 are omitted for the sake of simplicity):

a continuous power margin M1 (the distance between first cursor 21a and reference indicator 23—FIG. 8a) if first power index PIa is below first operating limit PL1;

a term power margin M2 (the distance between first cursor 21a and reference indicator 24—FIG. 8b) if first power index PIa is above first operating limit PL1 and below second operating limit PL2; and a transient power margin M3 (the distance between first cursor 21a and reference indicator 25—FIG. 8c) if first power index PIa is above second operating limit PL2 and below third operating limit PL3.

The displayed margin refers to the most critical engine parameter of each engine 2a, 2b, i.e. closest to the next operating limit not yet exceeded (index selection stage 14, in fact, selects the highest-value engine parameter in the uniform scale as equivalent index EI).

First and second cursor 21a, 21b therefore cooperate with column 20 and the reference indicators to simultaneously show the pilot the current values of power indexes PIa, PIb and the residual power margins M1, M2, M3 of engines 2a, 2b.

The device described has the following advantages.

Firstly, power indexes PIa, PIb provide the pilot with a concise, easily readable indication of the operating condition of each engine and the residual power margin that can be demanded. Particularly advantageous is the fact that, by means of a single instrument reading, the pilot is able to keep under control at all times the most critical monitored engine parameter (torque TQ, speed NG, temperature IYY), i.e. the one with the narrowest margin with respect to the next operating limit. In emergency situations, in particular, the pilot is therefore informed immediately of the available power margin, with very little possibility of pilot error caused by confusing the instruments, which may prove decisive in terms of safety.

Secondly, power indexes PIa, PIb are determined solely on the basis of continuously monitored engine parameters, and are therefore directly related to the actual power output and the residual power margin of the engines. The information supplied is therefore reliable at all times and unaffected by approximations caused, for example, by transmission members, or by power absorption by secondary on-board user devices. More specifically, the accuracy of power indexes PIa, PIb is not even impaired during transient emergency manoeuvres or takeoff, in which power demand is greater and the pilot needs the most reliable information possible.

Thirdly, though compact, the display shows the power indexes of all the engines at all times, so that the pilot is kept fully and reliably informed of the operating conditions of all the engines individually.

Clearly, changes may be made to the device as described herein without, however, departing from the scope of the present invention as defined in the accompanying Claims.

In particular, the scale conversions by scale conversion stage 12 and scale conversion stage 15 may comprise various classes of non-linear transformations, as opposed to interval-linear transformations only.

The invention claimed is:

1. A device for indicating a residual power margin of aircraft turbine engines, comprising:

detecting means (7) associated with at least one turbine engine (2a, 2b) of an aircraft to detect a number of first parameters (TQ, NG, ITT) related to a power output of the engine (2a, 2b);

calculating means (3) associated with the detecting means to calculate at least one second parameter (PI, PIa, PIb) indicating the power output of the engine (2a, 2b) on the basis of said first parameters (TQ, NG, ITT); and display means (4);

wherein said display means (4) comprise a power scale (20) having a plurality of reference indicators (23, 24, 25) indicating a plurality of operating limits (PL1, PL2, PL3) of the engine (2a, 2b); said plurality of operating limits including at least two of the following three operating limits;

a continuous power limit (TOL1, NGL1, ITTL1) indicating the maximum power that can be supplied continuously with no time limit;

a term power limit (TQL2, NGL2, ITTL2) which is higher than said continuous power limit (TQL1, NGL1, JTTL1) and indicates the maximum power than can be supplied for at most a predetermined time interval; and a transient power limit (TQL3, NGL3, ITTL3) which is higher than said term power limit (TQL2, NGL2, ITTL2) and indicates the maximum power than can be supplied for emergency manoeuvres over a short transient period only and not exceeding a predetermined duration, said display means (4) further having at least one cursor (21a, 21b) cooperating with and displayed next to said power scale (20) and said reference indicators (23, 24, 25) to simultaneously display a current value of the second parameter (PI, PIa, PIb) and an available power margin (M1, M2, M3) of the engine (2a, 2b), said available power margin defined as a difference between said second parameter and one of said reference indicators.

2. A device for indicating a residual power margin of aircraft turbine engines, comprising:

detecting means (7) associated with at least one turbine engine (2a, 2b) of an aircraft to detect a number of first parameters (TQ, NG, ITT) related to a power output of the engine (2a, 2b);

calculating means (3) associated with the detecting means to calculate at least one second parameter (PI, PIa, PIb) indicating the power output of the engine (2a, 2b) on the basis of said first parameters (TQ, NG, ITT); and display means (4);

wherein said display means (4) comprise a power scale (20) having at least one reference indicator (23, 24, 25) indicating an operating limit (PL1, PL2, PL3) of the engine (2a, 2b); and at least one cursor (21a, 21b) cooperating with said power scale (20) and with said reference indicator (23, 24, 25) to simultaneously display a current value of the second parameter (PI, PIa, PIb) and an available power margin (M1, M2, M3) of the engine (2a, 2b), and wherein said calculating means (3) comprise first scale conversion means (12) supplying third parameters (ETQ, ENG, EITT), each related to a respective one of said first parameters (TQ, NG, ITT); said third parameters (ETQ, ENG, EITT) being homogeneous and comparable with one another.

3. A device as claimed in claim 2, characterized in that said calculating means (3) comprise selection means (14) associated with the first scale conversion means (12) and configured to supply a fourth parameter (EI) selectively related to the highest of said third parameters (ETQ, ENG, EITT) in first operating conditions, and to a predetermined one of said third parameters (ETQ, ENG, EITT) in second operating conditions.

4. A device as claimed in claim 3, characterized in that, in said second operating conditions, said fourth parameter (EI) is related to a torque (TQ) supplied by the engine (2a, 2b).

5. A device as claimed in claim 3, characterized in that said calculating means (3) comprise second scale conversion means (15) associated with said selection means (14) and supplying said second parameter (PI, PIa, PIb) on the basis of said fourth parameter (EI).

6. A device as claimed in claim 5, characterized in that said first scale conversion means (12) and said second scale conversion means (15) are interval-linear.

7. A device as claimed in claim 5, characterized in that said first scale conversion means (12) and said second scale conversion means (15) are non-linear.

8. A device as claimed in claim 1, characterized in that said power scale (20) comprises three reference indicators (23, 24, 25), each indicating a respective one of said three operating limits (PL1, PL2, PL3) of the engine (2a, 2b).

* * * * *